United States Patent [19]

Ploeger

[11] E Re. 28,637

[45] Reissued Dec. 2, 1975

[54] VEHICLE LAMP AND TERMINAL THEREFOR

[76] Inventor: Kenneth C. Ploeger, 705 S. 10th St., Blue Springs, Mo. 64015

[22] Filed: May 6, 1974

[21] Appl. No.: 467,193

Related U.S. Patent Documents

Reissue of:

[64] Patent No.: 3,739,168
Issued: June 12, 1973
Appl. No.: 250,876
Filed: May 8, 1972

[52] U.S. Cl. ..... 240/7.1 R; 240/8.2
[51] Int. Cl.[2] ..... B60Q 1/00; B60Q 1/30
[58] Field of Search ..... 240/7.1 R, 8.2, 8.3, 153; 339/59 L, 61 L, 91 L, 94 L, 95 R, 95 D, 176 L, 188 R

[56] References Cited

UNITED STATES PATENTS

| | | | |
|---|---|---|---|
| 2,127,675 | 8/1938 | Clements | 339/188 R |
| 3,145,933 | 8/1964 | Dickson | 240/8.2 |
| 3,235,721 | 2/1966 | Dickson | 240/8.2 |
| 3,255,428 | 6/1966 | Robbins | 339/95 D |
| 3,335,268 | 8/1967 | Baldwin | 240/7.1 R |
| 3,488,626 | 1/1970 | Koerper et al. | 240/7.1 R X |
| 3,559,151 | 1/1971 | Gaynor | 339/95 D X |
| 3,581,080 | 5/1971 | Magi | 240/8.2 |
| 3,742,429 | 6/1973 | Morrisor | 339/176 L X |

*Primary Examiner*—Fred L. Braun
*Attorney, Agent, or Firm*—Fishburn, Gold & Litman

[57] ABSTRACT

A vehicle lamp for automobiles, trailers, trucks, and the like includes a housing having an open end compartment closed by a lens and a lamp support within the compartment for receiving a lamp having a lamp base with at least one lamp contact thereon and engageable with a portion of a terminal mounted on an insulating member and having a resilient finger portion of the terminal engageable with a bare end portion of an insulated conductor in a manner to cause flexing of the finger portion and clamping of the conductor by pressing the bare end portion of the conductor against the insulating member to prevent withdrawal therefrom.

7 Claims, 6 Drawing Figures

VEHICLE LAMP AND TERMINAL THEREFOR

Matter enclosed in heavy brackets [ ] appears in the original patent but forms no part of this reissue specification; matter printed in italics indicates the additions made by reissue.

The present invention relates to vehicle lamps and more particularly to a vehicle lamp having an insulating member therein and a terminal thereon adapted to engage and press a bare end portion of a conductor against the insulating member to prevent withdrawal of the conductor therefrom.

The principal objects of the present invention are: to provide a vehicle lamp for automobiles, trailers, trucks, and the like having a terminal mounted on an insulating member and adapted to engage and press a bare end portion of an insulated conductor against the insulating member to prevent withdrawal of the conductor therefrom; to provide such a vehicle lamp which is easily and quickly installed on a vehicle; to provide a grip type electrical connector for a vehicle lamp and including a terminal mounted on an insulating member and having a resilient finger portion engageable with a bare end portion of an insulated conductor for pressing same against the insulating member to prevent retractive movement of the conductor; to provide such a grip type electrical connector wherein the insulating member has resilient portions effecting sealing engagement with the conductor; and to provide such a vehicle signal lamp which is economical to manufacture, durable in construction, positive in operation, and particularly well adapted for the proposed use.

Other object and advantages of this invention will become apparent from the following description taken in connection with the accompanying drawings wherein are set forth by way of illustration and example certain embodiment of this invention.

The drawings constitute a part of this specification and include an exemplary embodiment illustrating various objects and features of the vehicle lamp and terminal therefor of the present invention.

Figure 1:
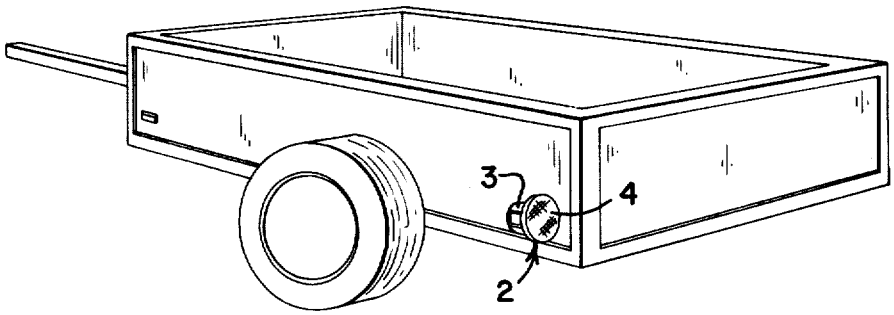
FIG. 1 is a perspective view of a vehicle having mounted thereon a vehicle lamp and terminal therefor embodying features of the present invention.
Figure 2:
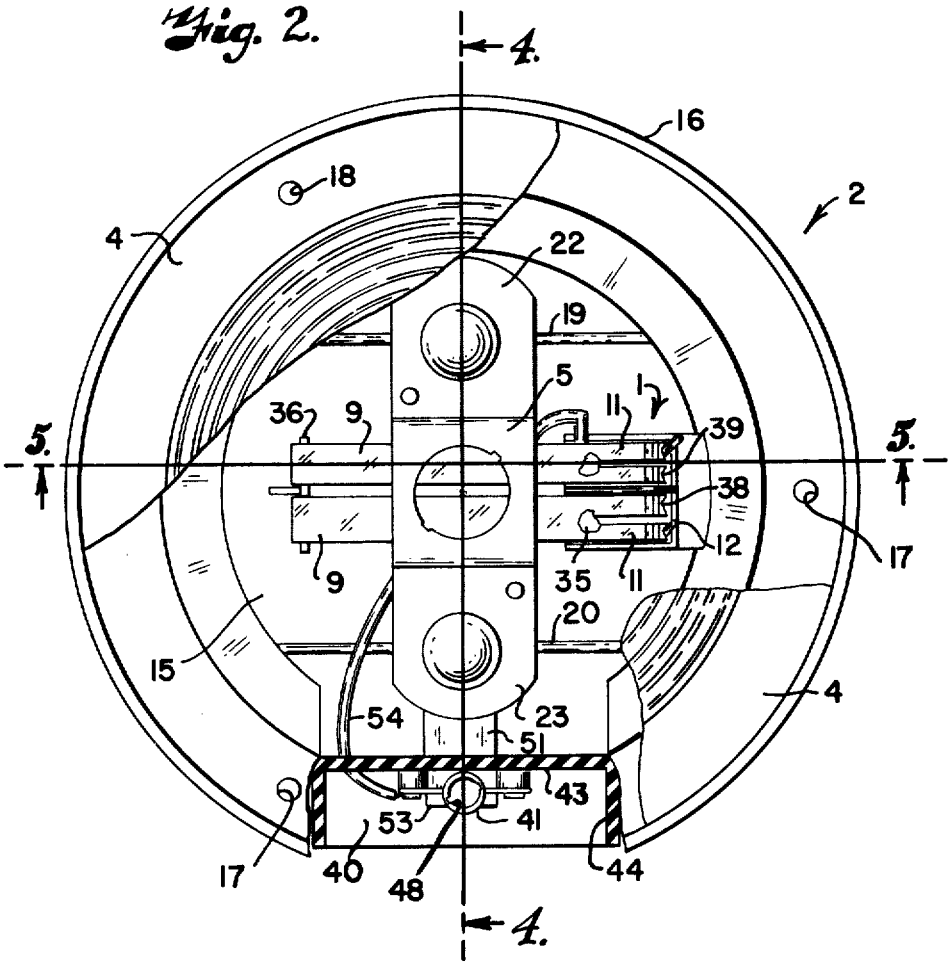
FIG. 2 is an enlarged front elevational view of the vehicle lamp with a portion of a lens broken away to better illustrate the component parts.
Figure 3:
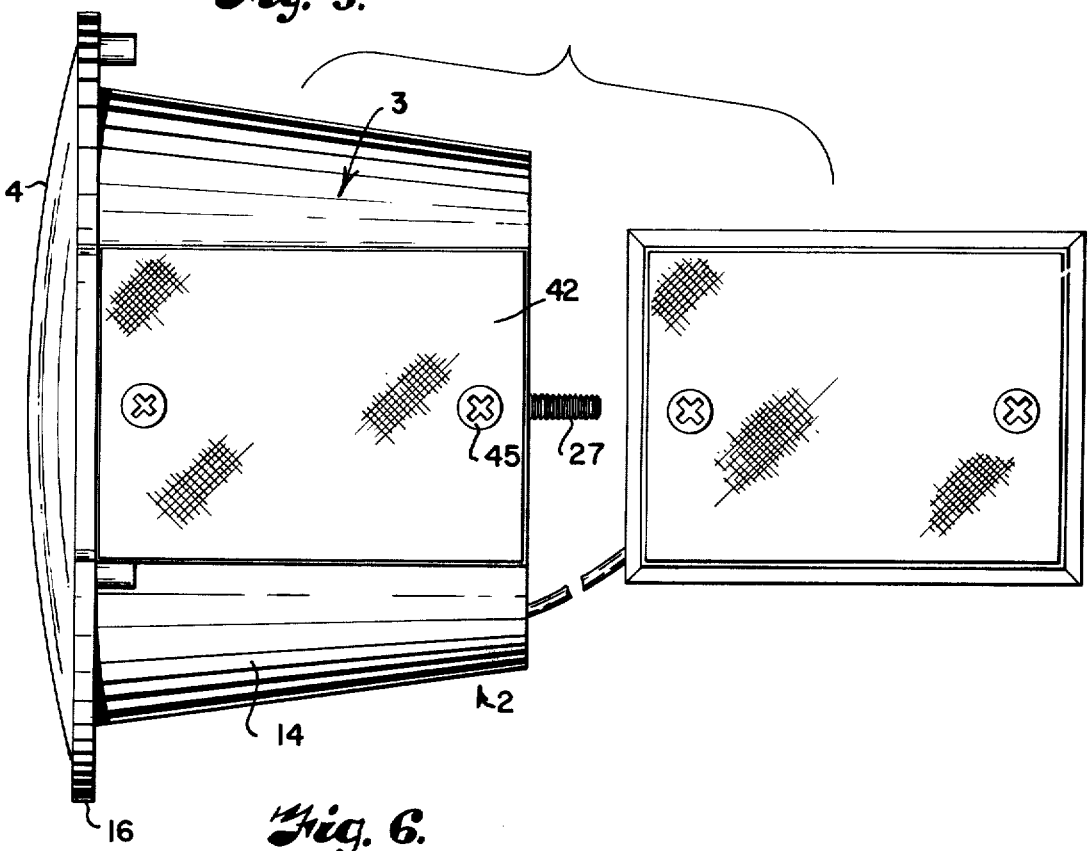
FIG. 3 is an enlarged side elevational view of the vehicle lamp and showing a second lamp connected thereto.
Figure 6:
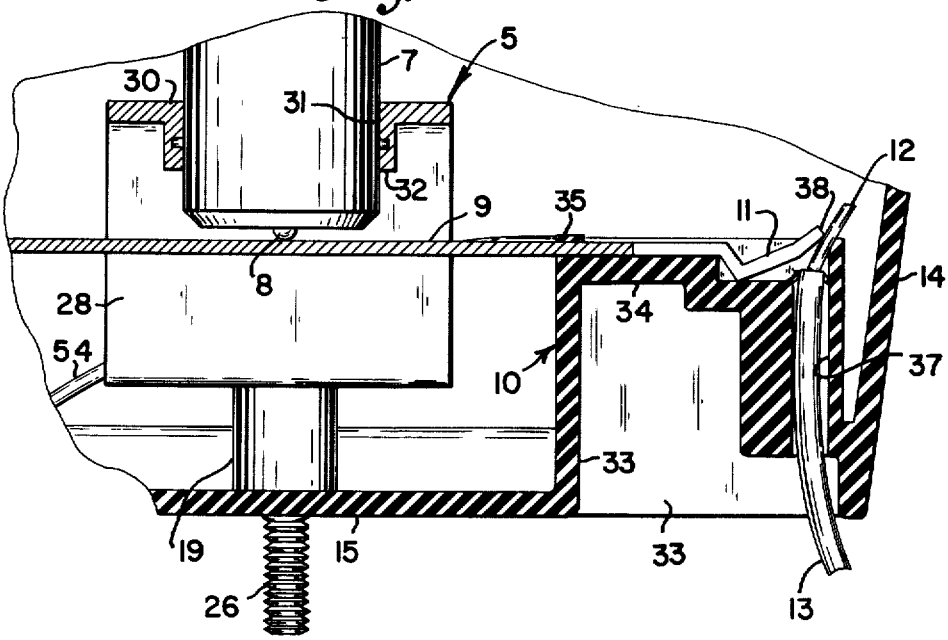
FIG. 6 is a further enlarged fragmentary sectional view of the terminal for the vehicle lamp.
Figure 4:
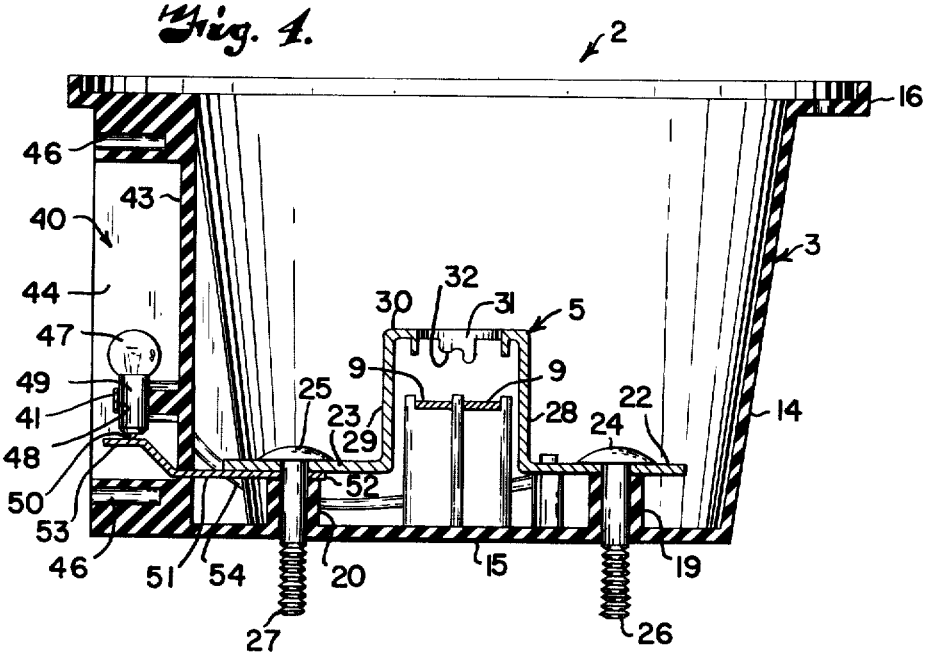
FIG. 4 is an enlarged sectional view taken on line 4—4, FIG. 2 and showing a lamp support within a main compartment and a lamp within a side compartment.
Figure 5:
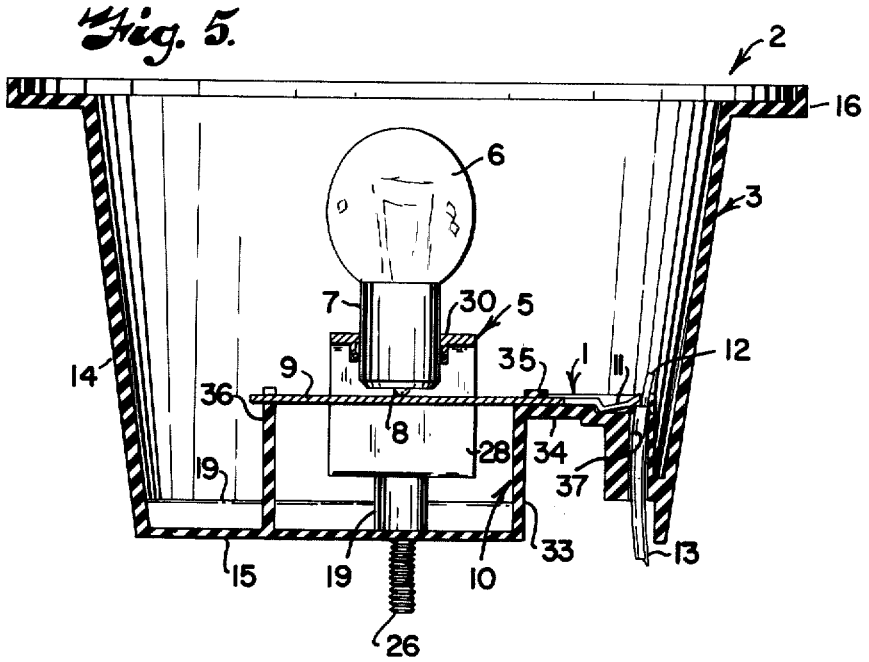
FIG. 5 is an enlarged sectional view taken on line 5—5, FIG. 2 and showing a terminal for engagement by a lamp contact and for holding a conductor against withdrawal from the vehicle lamp.

Referring more in detail to the drawings:

As required, detailed embodiments of the present invention are disclosed herein, however, it is to be understood that the disclosed embodiment are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriate detailed structure.

In the disclosed embodiment of the present invention, the reference numberal 1 generally designates a grip type electrical connector shown mounted in a vehicle lamp 2 for use on a vehicle, such as an automobile, trailer, truck, and the like. The vehicle, lamp 2 includes a housing 3 having an open end compartment closed by a lens 4 and a lamp support 5 within the compartment for receiving a lamp 6 having a lamp base 7 with a pair of lamp contacts 8 thereon which are each engageable with a flexible portion of a respective terminal 9 mounted on an insulating member 10 and each terminal 9 has at least one and preferably a pair of finger portions or locking tongues 11 engageable with a bare end portion 12 of an insulated conductor 13 in a manner to cause flexing of the respective finger portion 11 of the terminal 9 while pressing of the bare end portion 12 of the conductor 13 against the insulating member 10 to prevent withdrawal therefrom.

The housing may have any desired shape, however, the illustrated housing 3 has a side wall 14 and a base wall 15 defining a generally cylindrical lamp compartment having an open end. A flange 16 extends outwardly from the side wall 14 and forms a generally annular ring for supporting the lens 4. The flange 16 has a plurality of circumferentially spaced bores or aperture 17 therein to receive suitable fastening members, such as screws (not shown) for securing the lens in position on the flange 16.

The walls of the housing 3 may be formed of any suitable material providing a substantially rigid support for the grip type electrical connector 1, however, it is preferred that the housing 3 be formed of an insulating material, such as a thermo-plastic or the like, for economy and simplicity of manufacture.

The lens 4 may be any suitable light directing member mounted on the housing 3 to close the open end compartment. The lens 4 is illustrated as a generally convex member preferable formed of a suitable translucent material, such as plastic or the like, and having suitable light directing elements, such as ribs, prisms, or the like, formed therein. The lens 4 has a plurality of bores or apertures 18 therein which are alignable with respective bores or aperture 17 in the flange 16 and positioned and sized to permit the fastening members to extend therethrough.

The lamp support 5 receives the lamp 6 and positions the contacts 8 of the lamp base 7 in engagement with the respective terminals 9 and is illustrated as being mounted on projections or ribs 19 and 20 extending into the lamp compartment from the base wall 15 of the housing 3 and including spaced end flanges 22 and 23 suitably secured to the base wall 15, as by fastening members 24 and 25 respectively having threaded shafts 26 and 27 respectively extending from the base wall 15 for mounting the vehicle lamp 2 in a suitable bracket (not shown) on the vehicle, such as the illustrated trailer. The threaded shafts 26 and 27 are preferably formed of an electrical conductor, such as metal, to provide a ground for the grip type electrical connector 1 and the lamp support 5.

The illustrated lamp support 5 includes a pair of spaced upstanding arms 28 and 29 connected to the end flanges 22 and 23 respectively and extending substantially normal or perpendicular to the base wall 15 and a connecting portion 30 extending between the upstanding arms 28 and 29 to define a generally U-shaped member extending from the base wall 15.

A tubular socket 31 is mounted on and extends from the connecting portion 30 and toward the base wall 15 and the insulating members 10 thereon. The tubular socket 31 has suitable means thereon for receiving and supporting the lamp base 7 of a lamp 6. The illustrated socket 31 has a lower edge 32 adapted to be engaged by suitable projections extending from opposite sides of the lamp base 7. The lower edge 32 of the tubular socket 31 has a pair of recesses therein to receive the respective projections on the lamp base 7.

The lamp support 5 and the socket 31 thereon are preferably formed of a suitable electrical conductor, such as metal, to complete a grounded electrical circuit with a filament or filaments of the lamp 6 when the lamp base 7 is mounted in the socket 31. The socket 31 positions the lamp base 7 and the lamp contacts 8 and 9 thereon in engagement with the respective terminals 9 secured to and supported on the respective insulating member 10 to permit completion of a circuit to effect operation of the lamp 6.

The insulating member 10 may be formed of any suitable non-conductor, such as plastic, and may be formed integral with the housing 3 or be a separate structure suitably secured thereto. The insulating member 10 is shown as an integral portion of the housing 3 and which has upstanding side walls 33 defining a structure extending from the base wall 15 and toward the lamp support 5. A terminal support member 34 extends between portions of the side walls 33 and in the illustrated structure, is disposed substantially [paralel] *parallel* with the base wall 15. A fastening portion 35 extends from the terminal support member 34 and through a suitable aperture in the respective terminal 9 and is suitably deformed as by being flattened, to thereby secure one end of the respective terminal 9 on the terminal support member 34 intermediate the ends of the respective terminal 9.

A wall member 36 extends into the lamp compartment from the base wall 15 of the housing 3 and is spaced from the structure defined by the side walls 33 and the terminal support member 34 thereby providing support for the other end of the terminals 9. The portion of the terminals 9 between the wall member 36 and the terminal support member is sufficiently flexible to be deflected by engagement by the lamp contact 8 to maintain good contact therewith.

Each insulating member 10 has a guide passage 37 therein for receiving and holding each bare end portion 12 of an insulated conductor 13 and effecting sealing engagement therewith. The illustrated guide passage 37 is defined by a portion of one side wall 33. The guide passage 37 tapers from an entry portion thereof to an aperture through the terminal support member 34 defining an end of the guide passage and resilient portions or locking tongues to have sealing engagement with the conductor.

The finger portions 11 of each terminal 9 extend from the terminal support member 34 and each have an end portion 38 engageable with the bare end portion 12 of a respective electrical conductor 13. Each finger portion 11 of each terminal 9 is preferably formed of spring material and has a length relative to the terminal support member 34 such that insertion of a bare end portion 12 of an insulated conductor 13 between the respective finger portion 11 of the terminal 9 and through the guide passage 37 of the insulating member 10 causes flexing of the finger portion 11 of the respective terminal 9 and pressing or gripping of the bare end portion 12 against the insulating member 10 to clamp the bare end portion 12 in position and prevent withdrawal from the insulating member 10. The illustrated finger portions 11 of the terminals 9 intersect the axis of the passages 37 and each have a free end with a transversely curved edge portion or notch 39 being positioned in overlying relation with the aperture defining the end of the guide passage 37 and the resilient portions thereof.

The housing 3 has a second lamp compartment 40 having a lamp support 41 therein and a lens 42 positioned to permit light to extend from the housing 3 in a direction substantially normal or perpendicular to the direction that light extends from the lamp 6. The illustrated second lamp compartment is defined by a generally planar portion 43 of the side wall 14 and spaced side walls 44 extending outwardly from the side wall 14 thereby defining an open end of the second lamp compartment 40 which is closed by the lens 42.

The lens 42 is suitably secured to the housing 3, as by screws 45 extending into suitable threaded sockets 46 in front and rear ends of the second lamp compartment 40 of the housing 3 which are enclosed by enlarged portions or extensions of the flange 16 and the base wall 15 respectively.

The lens 42 may be any suitable light directing member mounted on the enlarged portion of the flange 16 and the base wall 15 to close the second lamp compartment. The lens 42 is illustrated as a generally planar member preferably formed of suitable translucent material, such as plastic or the like, and having suitable light directing elements, such as ribs, prisms, or the like, formed therein.

The lamp support member 41 is positioned within the second lamp compartment 40 for supporting a lamp 47 and positioning same to direct light from the housing 3. The lamp support member 41 may be any suitable structure adapted to support the lamp 47, such as a generally planar bar supported in spaced and parallel relation with the planar portion 43 of the side wall 14 and is preferably formed of an electrical conductor, such as metal to provide a circuit, as later described, to energize the lamp 47. A socket portion 48 is positioned in the planar bar and intermediate the ends thereof for receiving a lamp base 49 of the lamp 47. The socket portion 48 is a tubular member and preferably has suitable means for receiving and supporting the lamp base 49, such as opposed bayonet slots adapted to receive suitable projections extending from opposite sides of the lamp base 49.

The socket portion 48 positions the lamp base 49 and a lamp contact or contacts 50 thereon in engagement with a terminal 51 electrically connected to one of the terminals 9, as later described.

The terminal 51 preferably is formed of spring material and has one end portion 52 thereof in engagement with one end flange of the lamp support 5 and secured in position by the respective fastening member. An other end portion 53 of the terminal 51 extends through the planar portion 43 of the side wall 14 and has an arm portion engageable with the lamp contact or contacts 50 of the lamp 47.

A suitable electrical connection for energizing the lamp 47 is provided by an insulated conductor 54 electrically connected to and extending between the planar bar of the lamp support member 41 and one of the terminals 9 mounted on the insulating member 10.

The terminal 51 and the conductor 54 cooperate to effect a grounded circuit for energizing the lamp 47 when mounted in the socket portion 48 of the lamp support member 41. The threaded shafts 26 and 27 also effect grounding of the circuit to the lamp 47 when the vehicle lamp 2 is installed in a suitable metal bracket on a vehicle.

Installation of the vehicle lamp 2 on a vehicle, such as the illustrated trailer, is extremely fast and simple and requiring only insertion of the threaded shafts 26 and 27 in a suitable bracket (not shown) on the vehicle and placing suitable fastening members, such as nuts or the like on ends of the threaded shafts 26 and 27. Bare end portions 12 of respective insulated conductors 13 are then moved into and through the guide passages 37 in the insulating member 10 until the bare end portion 12 is forced between the finger portion 11 of the terminal 9 and portions of the insulating member 10. The bare end portions 12 of the insulated conductors 13 are positioned between the transversely curved edge portion or notch 39 and portions of the insulating member 10 and the terminals 9 are formed of spring material whereby the terminals flex or bend sufficiently to permit the bare end portions 12 to extend outwardly through the guide passage 37 and then hold same in clamping engagement with the insulating member 10 to prevent withdrawal of the conductor 13 from the grip type electrical connector 1 in the vehicle lamp 2.

It is to be understood that while I have illustrated and described one form of my invention, it is not to be limited to this specific form or arrangement of parts described and shown.

What I desire to claim and secure by Letters Patent is:

[1. A lamp structure comprising:

a. a housing having walls defining a support structure of electrically insulating material, one of said walls having passages therethrough with each being of a size to engage and guide an end portion of an insulated conductor wire into said housing;

b. conductor terminal members in said housing for effecting electrical connection between ends of conductor wires and electric lamp terminals, each of said terminal members being an electrically conductive strip of resilient relatively hard material;

c. said terminal members being fixed in said housing and having elongate locking tongues with free ends intersecting the axis of a respective conductor wire passage;

d. said free ends of the terminal member locking tongues each being inclined toward the direction of wire insertion movement and having edge portions operative to grip a respective wire end against an opposed side forming the passage and bite into the wire making a positive electrical contact therewith and resisting retractive movement of the respective conductor wire.]

[2. A lamp structure as set forth in claim 1 wherein:

a. said locking tongues being a pair for each terminal member and extending in side by side parallel relation;

b. said free ends of said tongues being transversely curved providing the respective free end with a notch and edges for receiving and engaging a conductor wire.]

[3. A lamp structure comprising:

a. a housing having a wall of electrically insulating material; said wall having a passage therethrough of a size to engage and permit an insulated conductor wire to extend therein;

b. a lens covered light transmitting opening in said housing;

c. a lamp support mounted in the housing for positioning an electric lamp for light therefrom to pass through said lens;

d. conductor terminal members for effective electrical connection between ends of conductor wires and electric lamp terminals; each of said terminal members being an electrically conductive strip of resilient relatively hard material;

e. said housing having a wall surface adjacent said conductor passages;

f. said terminal members being fixed in said housing and having elongate locking tongues with free ends facing toward said passages in opposed relation to said adjacent wall surface and sufficiently close thereto to be operable to clamp a wire end against said wall surface;

g. said free ends of the tongues being inclined toward the direction of wire insertion movement and having an edge operative to bite into the wire, make positive electrical contact therewith and resist retractive movement of the respective conductor wire.

h. mounting means exteriorly of said housing for securing an assembled lamp structure in an operative position, said conductor wires being insertable into the passages to complete electrical connection with the housing closed and mounted.]

[4. A lamp structure as set forth in claim 3 wherein:

a. said lamp support has a socket member with a socket receiving a lamp base with an open end through which end contacts of the lamp extend;

b. spaced supports on said housing wall and engaging said terminal members and holding same with a portion of said terminal members between said supports resiliently engages the lamp contacts;

c. said locking tongues being integral with said terminal members and extending from adjacent one support with the free ends spaced therefrom;

d. said passages being elongate and guiding the conductor wires during insertion thereof to flex the locking tongues and move into gripped engagement between said tongues and said wall surface]

[5. In a vehicle lamp having a housing with a base wall and a side wall defining an open end compartment closed by a lens.

a. a lamp support mounted in a housing having walls defining an open end compartment closed by a lens, said lamp support having a socket member with a socket for receiving a lamp base in electrical contact and having an open end through which an end contact of the lamp base extends, said lamp support having at least one leg extending from the socket member to a wall of the housing;

b. means securing said leg of said lamp support to the wall of the housing to position a lamp in the socket for directing light through the lens;

c. portions of the one of said housing walls defining a conductor wire passage opening exteriorly of the housing and of a size to engage and guide an end portion of an insulated conductor wire of a lamp circuit in a substantially linear path into said compartment;

d. a terminal member mounted relative to said one of said housing walls and having a resilient portion extending toward the open end of said socket member to be in electrical engagement with a lamp contact of a lamp therein, said terminal member having a resilient locking tongue with a free end intersecting the axis of said conductor wire passage;

e. said free end of the locking tongue of said terminal member being inclined toward the direction of wire insertion and having edge portions to engage a bare end portion of an insulated conductor against an opposite passage defining portion and the bite into said wire thereby gripping same to prevent retractive movement thereof, said lamp being such that the conductor connections are completed with the housing closed.]

[6. In a vehicle lamp as set forth in claim 5 wherein:

a. the lamp base has a pair of end contacts thereon;

b. a terminal member is mounted on the one of said housing walls for each of the end contacts on the lamp base with the resilient portion thereof engaging the respective lamp contact;

c. each terminal member has a pair of locking tongues; and d. said one of said housing walls has portions defining a conductor wire passage for each locking tongue of each terminal member.]

[7. In a vehicle lamp as set forth in claim 5 wherein:

a. the conductor wire passage defined by portions of the one of said housing walls is elongate and substantially in a line with the conductor entrance opening at the exterior end thereof;

b. said conductor entrance opening is of a size to receive an insulated conductor of a lamp circuit; and c. said portions of said one of said housing walls has a resilient portion in the conductor wire passage to have sealing engagement with a conductor.]

8. In a vehicle lamp as set forth in claim [7] *14* wherein:

a. the lamp base has a pair of end contacts thereon;

b. [the] *said* one *of said base and side walls* of said housing [*walls*] has a wall portion extending therefrom and a terminal support portion extending from said wall portion;

c. a terminal member for each of the end contacts on the lamp base is mounted on the terminal support portion of [*the*] *said* one *of said base and side*] *walls* of said housing [*walls*] with the resilient portion thereof engaging the respective lamp contact;

d. each terminal member has a pair of locking tongues;

e. the wall portion and the terminal support portion have portions positioned to define said conductor wire passages there being a passage for each locking tongue.

[9. In a vehicle lamp as set forth in claim 5 wherein the housing has walls defining a second compartment therein with an opening closed by a lens and including:

a. a lamp support mounted in a second compartment in the housing and having a socket member with a socket for receiving a lamp base in electrical contact and having an open end through which an end contact of the lamp base may extend;

b. means securing said socket member of said lamp support in the second compartment to position a lamp in said socket for directing light through a lens closing an opening in the second compartment;

c. a terminal member in electrical contact with and extending from said first named lamp support and having a resilient portion extending toward the open end of said socket member of said second named lamp support to electrically engage a lamp contact of a lamp therein; and d. an electrical conductor connected to and extending between said first named terminal member and said second named lamp support.]

*10. A vehicle lamp structure comprising:*

*(a) a housing with a base wall and a side wall defining an open end compartment closed by a lens;*

*(b) a lamp support mounted in said housing, said lamp support having a socket member with a socket for receiving a lamp base in electrical contact and having an open end through which an end contact of the lamp base extends, said lamp support having at least one leg extending from the socket member to adjacent said base wall of the housing;*

*(c) means securing said leg of said lamp support to said base wall of the housing to position a lamp in the socket for directing light through the lens;*

*(d) wall members upstanding on the base wall toward said socket member and positioned on opposite sides of said socket member, said wall members terminating in ends;*

*(e) a terminal member mounted on said ends of the upstanding wall members and having a resilient portion extending therebetween and under portions of said socket member for electrical engagement with a lamp contact of a lamp therein, said terminal member having one end thereof secured to one of said upstanding wall members and the other end engaging the other said upstanding wall member, and said terminal member being deflected by engagement of the lamp contact whereby said terminal member resiliently maintains said engagement; and*

*(f) means for effecting electrical connection of said terminal member and said socket member to a source of electrical power.*

*11. In a vehicle lamp as set forth in claim 10 wherein:*

*(a) said upstanding wall members being integral with the base wall and being electrically non-conductive;*

*(b) said lamp support having a pair of said legs in spaced apart relation with each leg being secured to the base wall and being generally upstanding thereon, said terminal member extending between said upstanding wall members and through an opening partially defined by said upstanding legs.*

*12. In a vehicle lamp as set forth in claim 11 including:*

*(a) a pair of end contacts on the lamp base;*

*(b) a pair of said terminal members mounted on said ends of said upstanding wall members in side by side spaced relation with the resilient portion of each in electrical engagement with a respective said end contact; and*

*(c) means cooperating with said terminal members and retaining same in spaced relation.*

*13. In a vehicle lamp as set forth in claim 11 wherein:*

*(a) said terminal member being generally planar between the upstanding wall members and having the other end engaging the other said upstanding wall member end and movable thereon allowing said resilient portion to flex between said upstanding wall members and resiliently engage said end contact.*

*14. In a vehicle lamp having a housing with a base wall and a side wall defining an open end compartment closed by a lens;*

(a) *a lamp support mounted in said housing, said lamp support having a socket member with a socket for receiving a lamp base in electrical contact and having an open end through which an end contact of the lamp base extends, said lamp support having at least one leg extending from the socket member to one of said base and side walls of the housing;*

(b) *means securing said leg of said lamp support to said one of said base and side walls of the housing to position a lamp in the socket for directing light through the lens;*

(c) *portions of said one of said base and side walls of said housing defining a conductor wire passage having an axis and opening exteriorly of the housing forming a conductor entrance opening, said passage being of a size to engage and guide an end portion of an insulated conductor wire of a lamp circuit in a substantially linear path into said compartment;*

(d) *a terminal member mounted relative to said one of said base and side walls of said housing and having a resilient portion extending toward the open end of said socket member to be in electrical engagement with a lamp contact of a lamp therein, said terminal member having a resilient locking tongue extending toward said conductor wire passage from one side thereof and with a free end intersecting the axis of said conductor wire passage;*

(e) *said free end of the locking tongue of said terminal member being inclined toward the direction of wire insertion and having edge portions to engage a bare end portion of an insulated conductor against a wall portion defining said conductor wire passage and bite into said wire thereby gripping same to prevent retractive movement thereof, said lamp being such that the conductor connections are completed with the housing closed;*

(f) *said conductor wire passage defined by portions of said one of said base and side walls of said housing is elongate and substantially in a line with said conductor entrance opening at the exterior end thereof;*

(g) *said conductor entrance opening is of a size to receive an insulated conductor of a lamp circuit; and*

(h) *said portions of said one of said base and side walls of said housing has a resilient portion in the conductor wire passage to have sealing engagement with a conductor.*

*15. In a vehicle lamp having a housing with a base wall and a side wall defining an open end compartment closed by a lens:*

(a) *a lamp support mounted in said housing, said lamp support having a socket member with a socket for receiving a lamp base in electrical contact and having an open end through which an end contact of the lamp base extends, said lamp support having at least one leg extending from the socket member to one of said base and side walls of the housing;*

(b) *means securing said leg of said lamp support to said one of said base and side walls of the housing to position a lamp in the socket for directing light through the lens;*

(c) *portions of said one of said base and side walls of said housing defining a conductor wire passage having an axis and opening exteriorly of the housing forming a conductor entrance opening, said passage being of a size to engage and guide an end portion of an insulated conductor wire of a lamp circuit in a substantially linear path into said compartment;*

(d) *a terminal member mounted relative to said one of said base and side walls of said housing and having a resilient portion extending toward the open end of said socket member to be in electrical engagement with a lamp contact of a lamp therein, said terminal member having a resilient locking tongue extending toward said conductor wire passage from a side thereof and with a free end intersecting the axis of said conductor wire passage;*

(e) *said free end of the locking tongue of said terminal member being inclined toward the direction of wire insertion and having edge portions to engage a bare end portion of an insulated conductor against a wall portion defining said conductor wire passage and bite into said wire thereby gripping same to prevent retractive movement thereof, said lamp being such that the conductor connections are completed with the housing closed;*

(f) *said housing having wall portions extending from said side wall and defining a second compartment therein with an opening closed by a lens and including:*

(1) *a lamp support mounted in said second compartment in the housing and having a socket member with a socket for receiving a lamp base in electrical contact and having an open end through which an end contact of the lamp base may extend;*

(2) *means securing said socket member of said lamp support in the second compartment to position a lamp in said socket for directing light through a lens closing an opening in the second compartment;*

(3) *a terminal member in electrical contact with and extending from said first named lamp support and having a resilient portion extending toward the open end of said socket member of said second named lamp support to electrically engage a lamp contact of a lamp therein; and*

(4) *an electrical conductor connected to and extending between said first named terminal member and said second named lamp support.*

* * * * *